United States Patent
Zeilenga et al.

(10) Patent No.: US 9,957,929 B2
(45) Date of Patent: May 1, 2018

(54) SYSTEM AND METHOD FOR CAPTURING CLEANER INTAKE AIR FOR USE WITHIN AN AIR INTAKE SYSTEM OF A WORK VEHICLE

(71) Applicant: CNH Industrial America, LLC, New Holland, PA (US)

(72) Inventors: Chad Zeilenga, Crete, IL (US); Thomas Chlystek, Homer, MI (US)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 14/325,587

(22) Filed: Jul. 8, 2014

(65) Prior Publication Data
US 2016/0010604 A1 Jan. 14, 2016

(51) Int. Cl.
*B01D 46/00* (2006.01)
*B01D 50/00* (2006.01)
(Continued)

(52) U.S. Cl.
CPC ......... *F02M 35/164* (2013.01); *B01D 46/442* (2013.01); *F02M 35/0209* (2013.01); *F02M 35/048* (2013.01); *F02M 35/10013* (2013.01)

(58) Field of Classification Search
CPC ................ B01D 46/00; B01D 46/0005; B01D 46/0068; B01D 50/00; F02M 35/024; F02M 35/164
(Continued)

(56) References Cited

U.S. PATENT DOCUMENTS 3,537,240 A 11/1970 Weidinger et al.
3,757,751 A 9/1973 Kitchin et al.
(Continued)

FOREIGN PATENT DOCUMENTS

DE 1910876 9/1970
EP 1138929 3/2001
(Continued)

OTHER PUBLICATIONS

Safari Snorkel 730HF Internet (6 Pages) Dated Nov. 10, 2014.
(Continued)

*Primary Examiner* — Frank Lawrence, Jr.
*Assistant Examiner* — Minh-Chau Pham
(74) *Attorney, Agent, or Firm* — Rickard K. DeMille; Rebecca L. Henkel (57) ABSTRACT

A system for capturing cleaner intake air for use within an air intake system of a work vehicle may generally include an intake duct defining an inlet for receiving air and at least one actuator associated with the intake duct. The actuator(s) may be configured to move at least a portion of the intake duct so as to adjust a position of the inlet relative to a fixed reference location on the work vehicle. In addition, the system may include at least one sensor configured to monitor an air-related parameter associated with the work vehicle and a controller communicatively coupled to the actuator(s) and the sensor(s). The controller may be configured to actively control the operation of the actuator(s) such that the position of the inlet is adjusted based on the air-related parameter so as to reduce an amount of particulates received within the intake duct.

14 Claims, 3 Drawing Sheets

(51) Int. Cl.
*F02M 35/024* (2006.01)
*F02M 35/16* (2006.01)
*F02M 35/04* (2006.01)
*B01D 46/44* (2006.01)
*F02M 35/10* (2006.01)
*F02M 35/02* (2006.01)

(58) Field of Classification Search
USPC .............. 55/385.3, 480, 482, 492, 497, 493;
123/198 E; 180/309
See application file for complete search history.

(56) References Cited

U.S. PATENT DOCUMENTS

| | | | |
|---|---|---|---|
| 3,844,202 A | 10/1974 | Ferguson | |
| 3,890,126 A * | 6/1975 | Joseph | B01D 46/00 |
| | | | 362/253 |
| 3,972,700 A * | 8/1976 | Gleockler | B01D 46/0005 |
| | | | 55/385.3 |
| 4,157,902 A * | 6/1979 | Tokar | F02M 35/024 |
| | | | 180/68.3 |
| 4,208,197 A * | 6/1980 | Yakimowich | B01D 50/00 |
| | | | 296/180.2 |
| 4,366,878 A | 1/1983 | Warf | |
| 4,514,201 A | 4/1985 | Brown | |
| 5,059,222 A | 10/1991 | Smith | |
| 6,584,768 B1 * | 7/2003 | Hecker | F01N 3/035 |
| | | | 55/318 |
| 6,660,070 B2 * | 12/2003 | Chung | B01D 46/008 |
| | | | 55/385.2 |
| 6,790,251 B1 | 9/2004 | Brady, Jr. | |
| 6,874,589 B1 | 4/2005 | Williams | |
| 7,210,444 B2 | 5/2007 | Korenjak et al. | |
| 7,678,168 B2 * | 3/2010 | Connelly | F16L 55/035 |
| | | | 180/309 |
| 8,152,880 B2 | 4/2012 | Matschl et al. | |
| 8,201,535 B2 | 6/2012 | Oakes | |
| 8,460,420 B2 * | 6/2013 | Darnell | B01D 46/0005 |
| | | | 123/198 E |
| 8,596,396 B1 | 12/2013 | Ricketts | |
| 8,794,222 B2 | 8/2014 | Schwandt et al. | |
| 2001/0049999 A1 | 12/2001 | Vanderveen et al. | |
| 2012/0247709 A1 | 10/2012 | Soldan et al. | |
| 2015/0027311 A1 * | 1/2015 | Link | B01D 46/0068 |
| | | | 95/279 |
| 2015/0275831 A1 * | 10/2015 | Chlystek | F02M 35/164 |
| | | | 55/337 |

FOREIGN PATENT DOCUMENTS

| | | |
|---|---|---|
| EP | 1201912 | 5/2002 |
| EP | 2540614 A1 | 1/2013 |
| EP | 2738379 | 6/2014 |
| FR | 2889256 | 2/2007 |

OTHER PUBLICATIONS

Polaris RZR 800 2008-2013 Airaid Box Filter Intake System with Snorkles ebay (3 Pages) Dated Nov. 10, 2014.
European Search Report for European Application No. 151751047 dated Nov. 12, 2015 (5 pages).
European Communication for European Application No. 15175104.7 dated Sep. 21, 2016 (3 pages).

* cited by examiner

SYSTEM AND METHOD FOR CAPTURING CLEANER INTAKE AIR FOR USE WITHIN AN AIR INTAKE SYSTEM OF A WORK VEHICLE

FIELD OF THE INVENTION

The present subject matter relates generally to work vehicles and, more particularly, to a system and method for capturing cleaner intake air for use within an air intake system of a work vehicle.

BACKGROUND OF THE INVENTION

Work vehicles typically include internal combustion engines that require clean air for use within the combustion process. Since many work vehicles, such as tractors and other agricultural vehicles, operate in fields and other harvesting environments in which the ambient air contains large amounts of dust, plant material and other particulates, an air intake system having an effective filter assembly is required. For example, conventional filter assemblies for work vehicles typically include a vortex or cyclone pre-cleaner configured to separate large particulates from the intake air and a porous air filter downstream of the pre-cleaner to provide the final stage of filtering prior to delivering the air into the engine.

The air intake system of a work vehicle may also include an intake duct extending horizontally and/or vertically from the filter assembly to a location adjacent to the vehicle's cab. To allow for a sufficient amount of air to enter the intake duct, a relatively large opening must be defined at the upper end of the duct. Unfortunately, such a large opening increases the likelihood that debris may enter the intake duct and flow into the filter assembly, which can significantly shorten the component life of the air filter. To at least partially address this issue, a mesh screen is typically disposed over the opening to shield the intake duct from relatively large debris. However, the screen is incapable of preventing smaller particulates from entering the intake duct and flowing into the filter assembly.

Accordingly, a system and related method that allows for the capture of cleaner intake air for use within an air intake system of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for capturing cleaner intake air for use within an air intake system of a work vehicle. The system may generally include an intake duct defining an inlet for receiving air and at least one actuator associated with the intake duct. The actuator(s) may be configured to move at least a portion of the intake duct so as to adjust a position of the inlet relative to a fixed reference location on the work vehicle. In addition, the system may include at least one sensor configured to monitor an air-related parameter associated with the work vehicle and a controller communicatively coupled to the actuator(s) and the sensor(s). The controller may be configured to actively control the operation of the actuator(s) such that the position of the inlet is adjusted based on the air-related parameter so as to reduce an amount of particulates received within the intake duct.

In another aspect, the present subject matter is directed to a system for capturing cleaner intake air for use within an air intake system of a work vehicle. The system may generally include an intake duct defining an inlet for receiving air and at least one actuator associated with the intake duct. The actuator(s) may be configured to move at least a portion of the intake duct so as to adjust at least one of a vertical position or a rotational orientation of the inlet relative to a fixed reference location on the work vehicle. The system may also include at least one particulate sensor mounted within the intake duct. The particulate sensor may be configured to monitor a particulate concentration of particulates contained within the air. In addition, the system may include a controller communicatively coupled to the actuator(s) and the particulate sensor(s). The controller may be configured to actively control the operation of the actuator(s) such that the vertical position and/or the rotational orientation of the inlet is adjusted based on the monitored particulate concentration so as to reduce an amount of particulates received within the intake duct.

In a further aspect, the present subject matter is directed to a method for capturing cleaner air for use within an air intake system of a work vehicle, wherein the air intake system includes an intake duct defining an inlet for receiving air. The method may generally include monitoring, with a controller, an air-related parameter associated with the work vehicle and adjusting, with the controller, a position of the inlet relative to a fixed reference location on the work vehicle based on the monitored air-related parameter such that an amount of particulates received within the intake duct is reduced.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for capturing cleaner air for use within an air intake system of a work vehicle. Specifically, in several embodiments, the system may include one or more actuators configured in operative association with an intake duct of the air intake system for moving at least a portion of the duct relative to a fixed reference location of the work vehicle. For example, the system may include a vertical actuator for vertically actuating at least a portion of the intake duct and/or a rotational actuator for rotationally actuating at least a portion of the intake duct. As a result, a vertical position and/or a rotational orientation of an inlet of the intake duct relative to the fixed reference location may be adjusted as the intake duct is moved via the actuator(s).

In addition, the system may include a controller communicatively coupled to one or more sensors configured to monitor an air-related parameter associated with the work vehicle. For instance, in several embodiments, the controller may be coupled to one or more particulate sensors for monitoring the concentration of particulates contained within the air flowing around the work vehicle and/or into the intake duct. In addition, or as an alternative thereto, the controller may be coupled to one or more wind sensors for monitoring the wind direction. By monitoring the particulate concentration and/or the wind direction, the controller may be configured to actively control the operation of the actuator(s) so as to adjust the position of the duct inlet in a manner that results in cleaner air being received within the air intake system. For instance, if it is detected that the particulate concentration of the air flowing directly above the inlet is less than the particulate concentration of the air flowing into the inlet, the controller may be configured to control the vertical actuator such that the vertical position of the inlet is adjusted upwardly towards the cleaner air. Similarly, if it is detected that the inlet is facing directly into the wind, the controller may be configured to control the rotational actuator such that the rotational orientation of the inlet is adjusted so as to be offset from the wind direction, thereby reducing the amount of wind-carried particulates being received within the inlet.

Figure 1:
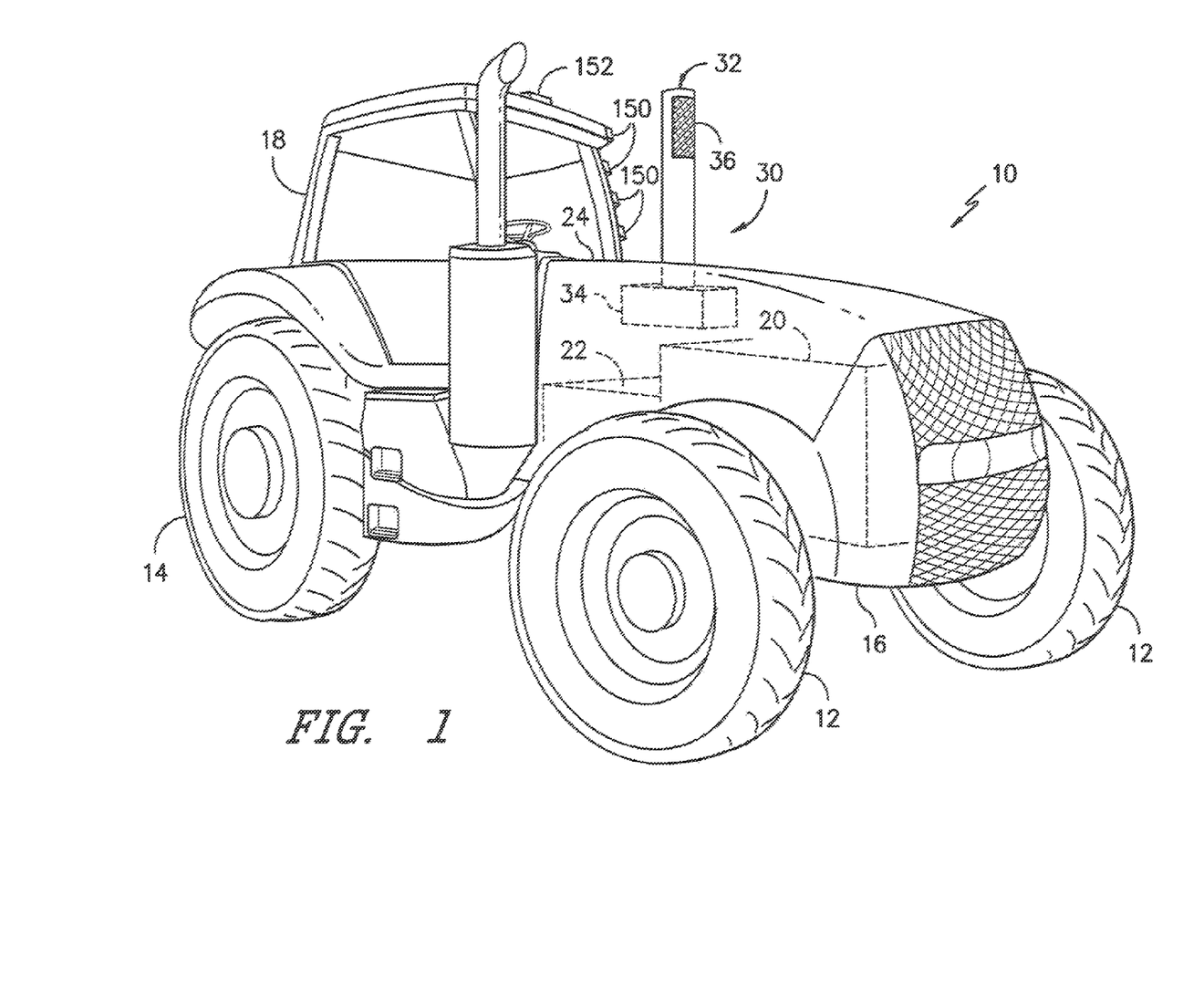
FIG. 1 illustrates a perspective view of one embodiment of a work vehicle in accordance with aspects of the present subject matter.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, road vehicles, loaders and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices (e.g., levers, pedals, control panels and/or the like) for permitting an operator to control the operation of the work vehicle 10. Additionally, the work vehicle 10 may include an engine 20 and a transmission 22 mounted on the chassis 16. The transmission 22 may be operably coupled to the engine 20 and may provide variably adjusted gear ratios for transferring engine power to the wheels 14 via a differential (not shown).

Additionally, as will be described in detail below, the work vehicle 10 may also include an air intake system 30 for receiving and cleaning air from the outside environment. The cleaned intake air may then be supplied to the engine 20 and mixed with fuel for combustion therein. As shown in FIG. 1, the air intake system 30 may include an intake duct 32 positioned at a location generally adjacent to the vehicle's cab 18. As is generally understood, the intake duct 32 may define an inlet 36 for receiving intake air. The intake air received within the intake duct 32 may then be directed through various downstream components of the air intake system 30 (e.g., a filter assembly 34) for cleaning and subsequent delivery to the engine 20.

Figure 2:
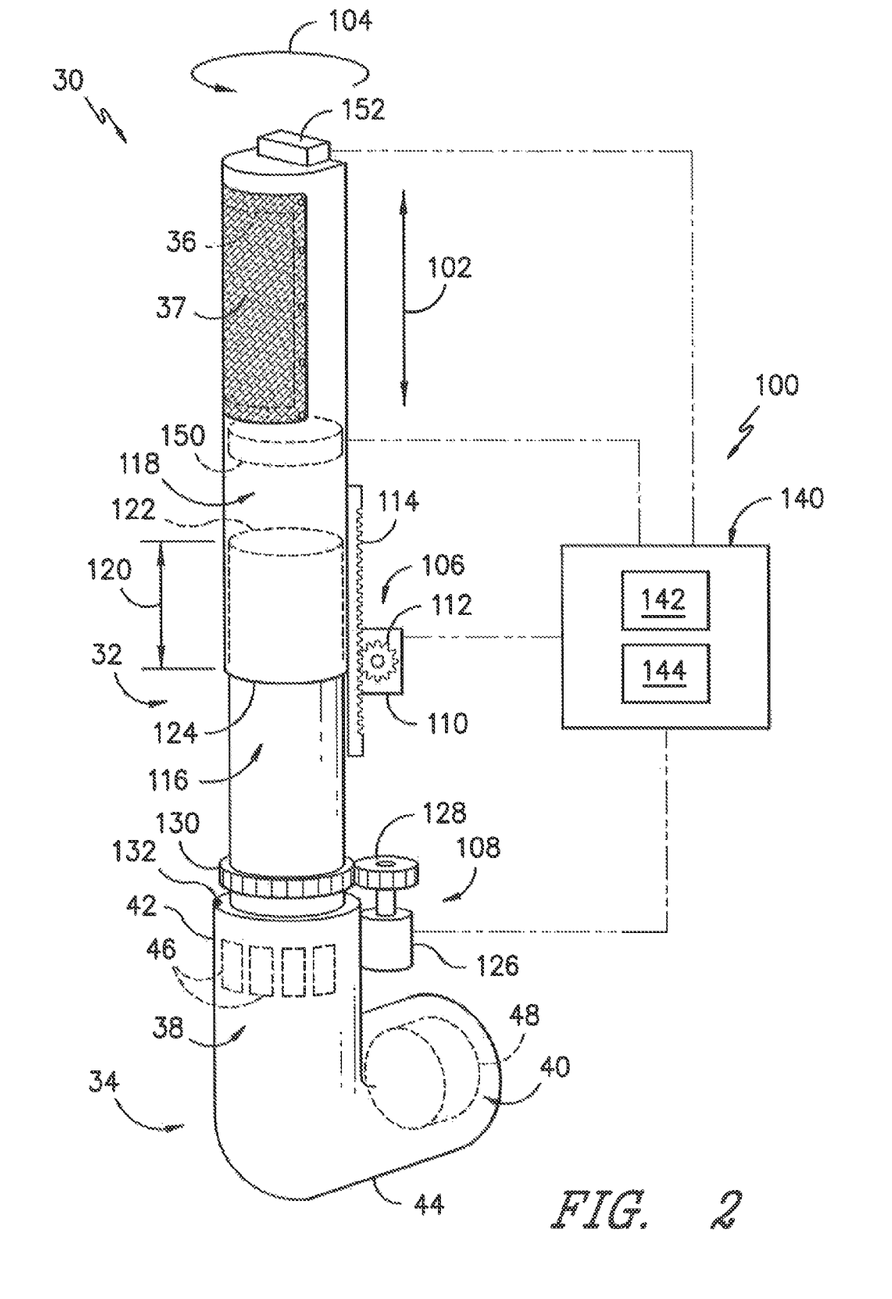
FIG. 2 illustrates a perspective view of one embodiment of an air intake system in accordance with aspects of the present subject matter, particularly illustrating one embodiment of a system for capturing cleaner air for use within the air intake system.

Referring now to FIG. 2, a perspective view of one embodiment of the air intake system 30 described above with reference to FIG. 1 is illustrated in accordance with aspects of the present subject matter. As indicated above, the air intake system 30 may generally include an intake duct 32 and a filter assembly 34 in flow communication with the intake duct 32. The intake duct 32 may generally be configured to receive air flowing outside the work vehicle 10 and direct such air into the filter assembly 34 for subsequent cleaning/filtering. Thus, in several embodiments, the intake duct 32 may generally comprise an elongated, conduit-like body defining an inlet 36 for receiving air. Additionally, as shown in FIG. 2, a mesh screen 37 may, optionally, be disposed over the inlet 36, thereby preventing large debris from entering the intake duct 32.

It should be appreciated that, although the inlet 36 is simply shown as being formed by a single opening defined adjacent to the top end of the intake duct 32, the inlet 36 may be formed by any number of openings configured to receive intake air. For example, the inlet 36 may be formed from a plurality of smaller openings defined in the intake duct 32 at spaced apart locations across the area covered by the screen 37. In addition, the intake duct 32 may also include rain deflection features (not shown) disposed at and/or adjacent to the opening(s) forming the inlet 36 so as to prevent rainwater from entering the intake duct 32.

The filter assembly 34 of the air intake system 30 may generally be configured to receive air from the intake duct 32 and clean/filter such air for subsequent delivery to the engine 20. Thus, in several embodiments, the filter assembly 34 may include a pre-cleaner 38 and an air filter 40 disposed downstream of the pre-cleaner 38. In addition, the filter assembly 34 may include a pre-cleaner housing 42 configured to encase the pre-cleaner 38 and a filter housing 44 configured to encase the air filter 40. It should be appreciated that the pre-cleaner housing 42 and the filter housing 44 may be formed integrally with one another (e.g., by forming both housings 42, 44 as a single continuous housing) or the pre-cleaner housing 42 and the filter housing 44 may comprise separate components configured to be separately coupled to one another.

As shown in FIG. 2, in several embodiments, the pre-cleaner housing 42 and the filter housing 44 may be oriented generally perpendicularly to one another such that the filter assembly 34 generally defines an "L" shape. As such, the air flowing into the intake duct 32 may be directed generally vertically downward through the pre-cleaner 38 and then generally horizontally through the air filter 40. However, in other embodiments, the pre-cleaner housing 42 and the filter housing 44 may have any other suitable orientation relative to one another. For example, in another embodiment, the pre-cleaner housing 42 and the filter housing 44 may be aligned along a common axis such that air flowing through the filter assembly 34 is directed continuously along such axis.

As is generally understood, the pre-cleaner 38 may be configured to remove portions of the dust, dirt, debris, plant matter and other particulates contained within the air flowing into the filter assembly 34 via the intake duct 32. Specifically, in several embodiments, the pre-cleaner 38 may include a plurality of tubes (e.g., turbo tubes), dirt separators, and/or any other suitable pre-cleaner elements 46 configured to separate particulates from the air via centripetal force. For example, the pre-cleaner elements 46 may be configured to impart a vortex or spinning motion to the flow of air entering the filter assembly 34. As a result, large particulates contained within the air may be forced radially outwardly along the inner wall of the pre-cleaner housing 42 by the centripetal force of the vortex/spinning motion. These large particulates may then be expelled from the filter assembly 34 via an outlet port (not shown) defined in the pre-cleaner housing 42.

Additionally, the air filter 40 may generally be configured to receive the cleaned air flowing from the pre-cleaner 38 and filter such air to provide a final stage of filtering prior to delivery of the air to the engine 20. Thus, as shown in FIG. 2, the air filter 40 may generally include one or more filter elements 48 configured to catch or trap the remaining particulates contained within the cleaned air. For instance, in several embodiments, the filter element(s) 48 may be made from a fibrous, porous or mesh material that allows air to pass therethrough while catching/trapping any particulates. The cleaned/filtered air may then be directed through a suitable conduit (not shown) to the engine 20, where the air may be mixed with fuel and combusted.

Referring still to FIG. 2, the work vehicle 10 may also include a system 100 for capturing cleaner air for use within the air intake system 30. Specifically, in several embodiments, the system 100 may be configured to actively adjust the position of the inlet 36 of the intake duct 32 such that cleaner air is received within the air intake system 30. For example, the system 100 may allow for an adjustment of the vertical position of the inlet 36 (e.g., along arrow 102 shown in FIG. 2) and/or the rotational orientation of the inlet 36 (e.g., along arrow 104 shown in FIG. 2) so as to move the inlet 36 to the appropriate position/orientation for capturing cleaner air.

As shown in the illustrated embodiment, the system 100 may include one or more actuators 106, 108 configured to actuate or move at least a portion of the intake duct 32, thereby allowing for the position of the inlet 36 to be adjusted. Specifically, as shown in FIG. 2, the system 100 may include both a vertical actuator 106 configured to adjust the vertical position of the inlet 36 relative to a fixed reference location on the work vehicle 10 and a rotational actuator 108 configured to adjust the rotational orientation of the inlet 36 relative to the fixed reference location. However, in other embodiments, the system 100 may include only the vertical actuator 106 or only the horizontal actuator 108. Additionally, in alternative embodiments, the vertical and rotational actuators 106, 108 may be integrated into a single actuator that is configured to adjust both the vertical position and the rotational orientation of the inlet 36.

In general, the vertical actuator 106 may correspond to any suitable device and/or mechanism that allows for all or a portion of the intake duct 32 to be moved vertically, thereby allowing the vertical position of the inlet 36 to be adjusted. For example, as shown in the illustrated embodiment, the vertical actuator 106 may correspond to a reversible electric motor 110 having a drive gear 112 rotatably coupled thereto. In such an embodiment, the drive gear 112 may be configured to engage a linear gear 114 (e.g., rack gear or a worm gear) coupled to a portion of the intake duct 32. Specifically, as shown in FIG. 2, the intake duct 32 includes a lower section 116 extending vertically from the filter assembly 34 and an upper section 118 extending from the lower section 116 to the top of the duct 32, with a portion of the lower section 116 being configured to be received within a portion of the upper section 118 so as to define an overlap length 120 between a top end 122 of the lower section 116 and a bottom end 124 of the upper section 118. As such, by coupling the linear gear 114 to the upper section 118, rotation of the drive gear 112 via the motor 110 may result in vertical movement of the upper section 118 relative to the lower section 116. In particular, rotation of the drive gear 112 in a first direction may result in the upper section 118 being moved vertically downward relative to the lower section 116 such that the overlap length 120 is increased, which may allow for the vertical position of the inlet 36 to be adjusted downward. Similarly, rotation of the drive gear 112 in a second, opposite direction may result in the upper section 118 being moved vertically upward relative to the lower section 116, thereby decreasing the overlap length 120 and adjusting the inlet position upward.

In other embodiments, the vertical actuator 106 may correspond to any other suitable device and/or mechanism that allows for the position of the inlet 36 to be vertically adjusted. For instance, the vertical actuator 106 may correspond to a suitable cylinder (e.g., a hydraulically, pneumatically or electrically actuated cylinder) that is directly or indirectly coupled to a portion of the intake duct 32 (e.g., the upper section 118 of the duct 32). In another embodiment, the vertical actuator 106 may correspond to a screw jack or similar mechanism for adjusting the vertical position of the inlet 36.

It should also be appreciated that, in alternative embodiments, the intake duct 32 may have any other suitable configuration that allows for all or a portion of the duct 32 to be vertically actuated. For instance, as opposed to configuring the upper section 118 to receive a portion of the lower section 116, the upper and lower sections 118, 116, may be coupled to one another via a middle section (not shown). In such an embodiment, the middle section may be configured to be received within one or both of the upper and/or lower sections 118, 116 or the middle section may be configured to be expandable/contractible with vertical movement of the intake duct 32 (e.g., by forming the middle section from a flexible material).

Similarly, the rotational actuator 108 may generally correspond to any suitable device and/or mechanism that allows for all or a portion of the intake duct 32 to be rotated, thereby allowing the rotational orientation of the inlet 36 to be adjusted. For example, as shown in the illustrated embodiment, the rotational actuator 108 may correspond to a reversible electric motor 126 having a drive gear 128 rotatably coupled thereto. In such an embodiment, the drive gear 128 may be configured to engage a ring gear 130 coupled around a portion of the intake duct 32 (e.g., around a portion of the lower section 118 of the duct 32). As such, by rotating the drive gear 128 in a first direction, the intake duct 32 may be rotated in a corresponding direction relative to the filter assembly 34. Similarly, by rotating the drive gear 128 in the other direction, the intake duct 32 may be rotated in the opposite direction relative to the filter assembly 34.

In other embodiments, the rotational actuator 108 may correspond to any other suitable device and/or mechanism that allows for the rotational orientation of the inlet 36 to be adjusted. For instance, the rotational actuator 108 may correspond to a belt/pulley arrangement or a chain/sprocket arrangement. In another embodiment, a cylinder actuator (e.g., a hydraulically, pneumatically or electrically actuated cylinder) may be coupled to the intake duct 32 in a manner that allows for the linear motion of the cylinder piston to be converted to rotational motion of the duct 32.

As indicated above, the actuator(s) 106, 108 may be configured to allow the position of the inlet 26 to be adjusted relative to a fixed reference location on the work vehicle 10. In general, the fixed reference location may correspond to any suitable location on and/or within any component of the work vehicle 10 that is not actively moved as a result of actuation by the actuator(s) 106, 108. For example, as shown in FIG. 2, the reference location may correspond to a fixed point on the filter assembly 34 (e.g., at point 132). In such instance, vertical movement of the upper section 118 of the duct 32 relative to the lower section 116 may result in the vertical position of the inlet 26 being adjusted relative to the fixed point 132. Similarly, rotation of the intake duct 32 using the rotational actuator may result in the rotational orientation of the inlet 36 being adjusted relative to the fixed point 132.

Referring still to FIG. 2, the system 100 may also include a controller 140 communicatively coupled to the vertical and rotational actuators 106, 108. Specifically, in several embodiments, the controller 140 may be configured to transmit control signals to each actuator 106, 108 for controlling its operation. Thus, by controlling the operation of each actuator 106, 108, the controller 140 may be configured to automatically adjust the position of the inlet 36. As will be described below, such control of the actuators 106, 108 may be based upon an air-related parameter(s) monitored by one or more sensors coupled to the controller 140.

In general, the controller 140 may correspond to any suitable processor-based device and/or any combination of processor-based devices, such as one or more computing devices. Thus, in several embodiments, the controller 140 may generally include one or more processors 142 and associated memory devices 144 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 144 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 144 may generally be configured to store suitable computer-readable instructions that, when implemented by the processor(s) 142, configure the controller 140 to perform various computer-implemented functions. In addition, the controller 140 may also include various other suitable components, such as a communications circuit or module, one or more input/output channels, a data/control bus and/or the like.

In several embodiments, the controller 140 may be communicatively coupled to one or more sensors 150, 152 configured to monitor an air-related parameter associated with the work vehicle 10. For example, the controller 140 may be communicatively coupled to one or more particulate sensors 150 configured to monitor the concentration of particulates contained within the air flowing past the work vehicle 10 and/or entering the intake duct 32. In such an embodiment, the particulate sensor(s) 150 may be disposed at any suitable location on and/or within a component of the work vehicle 10 that allows the sensor(s) 150 to monitor the particulate concentration within the air. For instance, as shown in FIG. 2, a particulate sensor(s) 150 may be mounted within the intake duct 32, such as at a location adjacent to the inlet 36. In addition, or as alternative thereto, one or more particulate sensors 150 may be mounted at a location exterior to the intake duct 32, such as by mounting the particulate sensor(s) 150 to the outer surface of the duct 32 (e.g., at a location adjacent to the inlet 36 and/or multiple locations along the height of the duct 32) or by mounting the particulate sensor(s) 150 to any other suitable component(s) of the work vehicle 10. For example, as shown in FIG. 1, a plurality of particulate sensors 150 may be mounted at spaced apart locations on the cab 18 to provide particulate concentration measurements at differing heights relative to the ground.

It should be appreciated that the particulate sensor(s) 150 may generally correspond to any suitable sensor(s) and/or other sensing device(s) that allow for the amount of particulates contained within air to be monitored. For instance, in one embodiment, the particulate sensor(s) 150 may correspond to one or more optical sensors. In such an embodiment, the optical sensor(s) may, for example, be configured to detect the presence of particulates within the air by detecting light reflected off of the particulates as such particulates flow past the sensor(s). In other embodiments, the particulate sensor(s) may correspond to any other suitable sensor(s) and/or sensing device(s).

By monitoring the particulate concentration within the air flowing around the work vehicle 10 and/or into the intake duct 32 via the particulate sensor(s) 150, the controller 140 may be configured to control the operation of the actuator(s) 106, 108 so as to adjust the position of the inlet 36 in a manner that reduces the amount particulates flowing into and through the air intake system 30. For example, if it is detected that cleaner air is located at a height above the current vertical position of the inlet 36 (e.g., via signals received from the sensor(s) 150 mounted on the cab 18), the controller 140 may be configured to control the vertical actuator 106 so that the inlet position is adjusted upward. Similarly, if it is determined that cleaner air will be received within the intake duct 32 if the inlet 36 rotated to a different rotational orientation than its current rotational orientation, the controller 140 may be configured to control the rotational actuator 108 so that the rotational orientation of the inlet 36 is adjusted accordingly.

In several embodiments, the controller 140 may be configured to adjust the position of the inlet 36 so that the particulate concentration of the air received within the intake duct 32 is less than a predetermined particulate threshold. For instance, when a particulate sensor(s) 150 is mounted within the intake duct 32 and/or at a location adjacent to the inlet 36, the controller 140 may be configured to actively monitor the particulate concentration of the air received within the air intake system 30 and compare such concentration to the predetermined particulate threshold. If the measured concentration is less than the predetermined threshold, the inlet 36 may be maintained at its current position. However, if the measured concentration exceeds the predetermined threshold, the inlet position may be adjusted until the measured concentration falls below the predetermined threshold. For example, the controller 140 may be configured to continuously monitor the particulate concentration as the inlet 36 is raised/lowered and/or rotated via control of the actuator(s) 106, 108. In doing so, if the controller 140 detects that the particulate concentration is decreasing as the inlet 36 is moved in a particular direction (e.g., up/down and/or clockwise/counter-clockwise), the controller 140 may continue to adjust the inlet position in such direction in an attempt to find a suitable location at which the particulate concentration is less than the predetermined threshold.

It should be appreciated that the predetermined particulate threshold may generally correspond to any suitable particulate concentration level. However, in certain applications, the specific threshold selected for use may vary depending on the flow capacity of the air intake system 30 and/or any other suitable factors, such as the capabilities and/or specifications of the filter assembly 34.

In addition to the particulate sensor(s) 150, or as an alternative thereto, the controller 140 may be communicatively coupled to any other suitable sensor(s) configured to monitor an air-related parameter of the work vehicle 10. For example, the controller 140 may be communicatively coupled to one or more wind sensors 152 (e.g., an anemometer) configured to monitor the wind direction. In such an embodiment, the wind sensor(s) 152 may be located at any suitable location on the work vehicle 10 that allows the sensor(s) 152 to detect the wind direction, such as by being mounted on the cab 18 (e.g., as shown in FIG. 1) or on the intake duct 32 (e.g., as shown in FIG. 2).

Since particulates are often carried by the wind, it may be desirable to adjust the position of the inlet 36 so as to offset its rotational orientation relative to the wind direction. Thus, by monitoring the wind direction, the controller 140 may be configured to control the rotational actuator 108 so that an angular offset is defined between the rotational orientation of the inlet 36 and the wind direction. For instance, in several embodiments, the controller 140 may be configured to rotate the intake duct 32 such that a vertical plane extending through the front center of the inlet 36 is offset from the wind direction by at least 45 degrees, such as at least 60 degrees or at least 90 degrees. Additionally, in a particular embodiment, the controller 140 may be configured to rotate the intake duct 32 such that its rotational orientation is offset from the wind direction by about 180 degrees. In such instance, the rotational orientation of the inlet 36 may be considered to be offset form the wind direction by about 180 degrees if a vertical plane extending through the front center of the inlet 36 is offset from the wind direction by 180 degrees +/−20 degrees.

Figure 3:
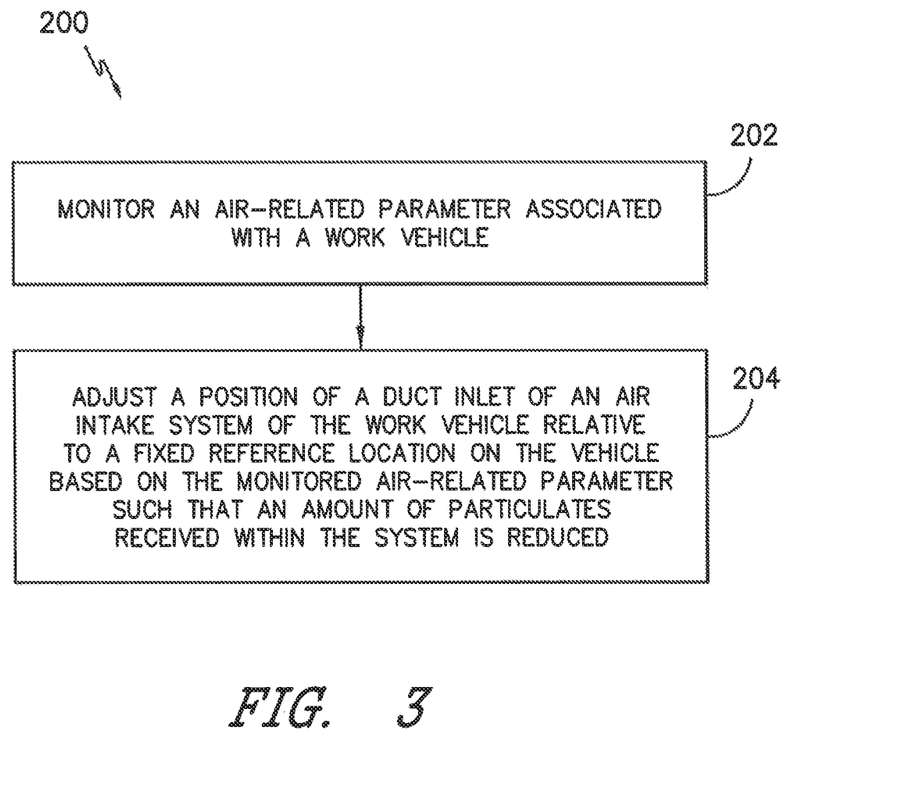
FIG. 3 illustrates a flow diagram of one embodiment of a method for capturing cleaner air for use within an air intake system of a work vehicle.

As indicated above, it should be appreciated that the present subject matter is also directed to a method for capturing cleaner air for use within an air intake system of a work vehicle. For example, FIG. 3 illustrates a flow diagram of one embodiment of such a method 200. As shown, the method 200 includes, at (202), monitoring an air-related parameter associated with a work vehicle 10. For instance, as indicated above, the controller 140 may be configured to monitor (via the sensor(s) 150, 152) one or more air-related parameters, such as the particulate concentration of the air and/or the wind direction. In addition, as shown in FIG. 3, the method 200 includes, at (204), adjusting a position of a duct inlet of an air intake system of the work vehicle relative to a fixed reference location on the vehicle based on the monitored air-related parameter such that an amount of particulates received within the system is reduced. Specifically, as described above, the controller 140 may be configured to actively adjust the position of the inlet 36 (e.g., via the actuator(s) 106, 108) based on the measurement signals received from the sensor(s) 150, 152 in order to appropriately position the inlet 36 at a suitable location for receiving cleaner intake air.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for capturing cleaner intake air for use within an air intake system of a work vehicle, the system comprising:
    an intake duct defining an inlet for receiving air;
    at least one actuator associated with the intake duct, the at least one actuator being configured to move at least a portion of the intake duct so as to adjust a position of the inlet relative to a fixed reference location on the work vehicle;
    at least one sensor configured to monitor an air-related parameter associated with the work vehicle, wherein the air-related parameter corresponds to a particulate concentration of the particulates contained within the air received within the intake duct, and wherein the at least one sensor comprises a particulate sensor; and
    a controller communicatively coupled to the at least one actuator and the at least one sensor, the controller being configured to:
        determine whether the particulate concentration of the air received within the intake duct exceeds a predetermined particulate threshold;
        responsive to a determination that the particulate concentration of the air received within the intake duct exceeds the predetermined particulate threshold, control the operation of the at least one actuator such that the position of the inlet is adjusted until the particulate concentration of the air received within the intake duct is less than the predetermined particulate threshold.

2. The system of claim 1, wherein the position of the inlet corresponds to at least one of a vertical position or a rotational orientation of the inlet relative to the fixed reference location.

3. The system of claim 1, wherein the at least one actuator comprises at least one of a vertical actuator configured to adjust the vertical position of the inlet or a rotational actuator configured to adjust the rotational orientation of the inlet.

4. The system of claim 1, wherein the particulate sensor is mounted within the intake duct.

5. The system of claim 1, wherein the particulate sensor is positioned outside the intake duct.

6. The system of claim 1, wherein the air-related parameter comprises a wind direction.

7. The system of claim 6, wherein the controller is configured to control the operation of the at least one actuator such that a rotational orientation of the inlet is offset from the wind direction by at least 45 degrees.

8. The system of claim 7, wherein the controller is configured to control the operation of the actuator that the rotational orientation of the inlet is offset from the wind direction by about 180 degrees.

9. A system for capturing cleaner intake air for use within an air intake system of a work vehicle, the system comprising:
- an intake duct defining an inlet for receiving air;
- at least one actuator associated with the intake duct, the at least one actuator being configured to move at least a portion of the intake duct so as to adjust at least one of a vertical position or a rotational orientation of the inlet relative to a fixed reference location on the work vehicle;
- at least one particulate sensor mounted within the intake duct, the at least one particulate sensor configured to monitor a particulate concentration of particulates contained within the air received within the intake duct; and
- a controller communicatively coupled to the at least one actuator and the at least one particulate sensor, the controller being configured to:
  - determine whether the particulate concentration of the air received within the intake duct exceeds a predetermined particulate threshold;
  - responsive to a determination that the particulate concentration of the air received within the intake duct exceeds the predetermined particulate threshold, control the operation of the at least one actuator such that the at least one of the vertical position or the rotational orientation of the inlet is adjusted until particulate concentration of the air received within the intake duct is less than the predetermined particulate concentration.

10. A method for capturing cleaner air for use within an air intake system of a work vehicle, the air intake system comprising an intake duct defining an inlet for receiving air, the method comprising:
- monitoring, with a controller, an air-related parameter associated with the work vehicle, wherein monitoring the air-related parameter comprises receiving, with the controller, signals from a particulate sensor associated with a particulate concentration of the particulates contained within the air received within the intake duct;
- determining whether the particulate concentration of the air received within the intake duct exceeds a predetermined particulate threshold;
- responsive to a determination that the particulate concentration of the air received within the intake duct exceeds the predetermined particulate threshold, adjusting, with the controller, a position of the inlet relative to a fixed reference location on the work vehicle based on the monitored air-related parameter such that an amount of particulates received within the intake duct is reduced to below the predetermined particulate threshold.

11. The method of claim 10, wherein the at least one actuator comprises at least one of a vertical actuator for adjusting the vertical position of the inlet or a rotational actuator for adjusting the rotational orientation of the inlet.

12. The method of claim 10, wherein the particulate sensor is mounted within the intake duct or outside the intake duct.

13. The method of claim 10, wherein monitoring an air-related parameter comprises receiving, with the controller, signals from a wind sensor associated with a wind direction.

14. The method of claim 13, wherein adjusting the position of the inlet comprises adjusting a rotational orientation of the inlet relative to the fixed reference location such that the rotational orientation is offset from the wind direction by at least 45 degrees.

* * * * *